US008029714B2

(12) United States Patent  
Hatch

(10) Patent No.: US 8,029,714 B2  
(45) Date of Patent: Oct. 4, 2011

(54) RADIAL SEAL AND METHOD OF MAKING

(75) Inventor: Frederick R. Hatch, Ann Arbor, MI (US)

(73) Assignee: Federal-Mogul World Wide, Inc., Southfield, MI (US)

( * ) Notice: Subject to any disclaimer, the term of this patent is extended or adjusted under 35 U.S.C. 154(b) by 863 days.

(21) Appl. No.: 11/774,233

(22) Filed: Jul. 6, 2007

(65) Prior Publication Data

US 2008/0010827 A1  Jan. 17, 2008

Related U.S. Application Data

(63) Continuation-in-part of application No. 11/224,362, filed on Sep. 12, 2005.

(51) Int. Cl.
*B32B 37/02* (2006.01)
*B29C 43/18* (2006.01)
*F01C 19/00* (2006.01)
*F17J 15/32* (2006.01)

(52) U.S. Cl. ........ 264/261; 264/319; 264/275; 425/112; 425/129.1; 277/571; 277/549

(58) Field of Classification Search ............ 264/261, 264/266, 319, DIG. 64; 425/DIG. 47, 112, 425/127, 129.1; 277/571, 549, 310
See application file for complete search history.

(56) References Cited

U.S. PATENT DOCUMENTS

| | | | | |
|---|---|---|---|---|
| 3,276,115 A | * | 10/1966 | Hansz | 29/527.1 |
| 3,493,645 A | * | 2/1970 | Schmuckal et al. | 264/161 |
| 3,767,739 A | * | 10/1973 | Smith et al. | 264/161 |
| 3,913,924 A | * | 10/1975 | Barefoot et al. | 277/574 |
| 3,939,551 A | * | 2/1976 | Clark et al. | 29/417 |
| 3,985,487 A | * | 10/1976 | Clark | 425/304 |
| 4,006,210 A | * | 2/1977 | Denton | 264/250 |
| 4,155,153 A | * | 5/1979 | Bainard et al. | 29/469.5 |
| 4,183,892 A | * | 1/1980 | Corsi et al. | 264/263 |
| 4,258,927 A | * | 3/1981 | Cather, Jr. | 277/309 |
| 4,274,641 A | | 6/1981 | Cather, Jr. | 277/153 |
| 4,406,847 A | * | 9/1983 | O'Neal et al. | 264/138 |

(Continued)

FOREIGN PATENT DOCUMENTS

DE  35 24 461  1/1987

(Continued)

*Primary Examiner* — Joseph S Del Sole
*Assistant Examiner* — Nahida Sultana
(74) *Attorney, Agent, or Firm* — Robert L. Stearns; Dickinson Wright, PLLC

(57) ABSTRACT

A method of manufacturing a radial shaft seal assembly. The method includes the step of stretching an inner diameter of a ring-shaped polytetrafluoroethylene seal radially outward from an axis with a mandrel to a first stretched condition on a mold core element. The method also includes the step of defining a substantially enclosed mold cavity around the polytetrafluoroethylene seal stretched over the mold core element with at least one mold element. The method also includes the step of locating a rigid casing within the mold cavity spaced from the stretched polytetrafluoroethylene seal. The method also includes the step of introducing a liquefied rubber elastomer into the mold cavity. The method also includes the step of molding the liquefied rubber elastomer under heat and pressure such that the rigid casing and polytetrafluoroethylene seal in a stretched state are bonded to a solid rubber elastomer member. The method also includes the step of removing the collectively bonded polytetrafluoroethylene seal and rigid casing and rubber elastomer member from the mold core element without stretching the inner diameter of the polytetrafluoroethylene seal beyond the first stretched condition.

3 Claims, 3 Drawing Sheets

U.S. PATENT DOCUMENTS

| | | | |
|---|---|---|---|
| 4,436,317 A | 3/1984 | Schmitt | 277/134 |
| 4,464,322 A * | 8/1984 | Butler | 264/138 |
| 4,501,431 A | 2/1985 | Peisker et al. | 277/134 |
| 4,578,856 A | 4/1986 | Butler | 29/451 |
| 4,613,143 A | 9/1986 | Butler | 277/134 |
| 4,650,196 A | 3/1987 | Bucher et al. | 277/152 |
| 4,689,190 A * | 8/1987 | Peisker et al. | 264/159 |
| 4,732,350 A * | 3/1988 | Lamont | 244/103 S |
| 4,824,357 A * | 4/1989 | Christiansen | 425/417 |
| 4,957,680 A | 9/1990 | Saxod et al. | |
| 5,082,612 A * | 1/1992 | Butler et al. | 264/138 |
| 5,183,271 A | 2/1993 | Wada et al. | 277/152 |
| 5,346,662 A * | 9/1994 | Black et al. | 264/138 |
| 5,431,872 A * | 7/1995 | Sink | 264/161 |
| 5,577,741 A | 11/1996 | Sink | 277/153 |
| 6,102,409 A | 8/2000 | Furuyama et al. | 277/562 |
| 6,149,853 A * | 11/2000 | Luckett et al. | 264/266 |
| 6,213,476 B1 * | 4/2001 | Chandler et al. | 277/569 |
| 6,428,013 B1 | 8/2002 | Johnston et al. | 277/400 |
| 6,620,361 B1 | 9/2003 | Longtin et al. | 264/138 |
| 6,730,247 B2 * | 5/2004 | De Winter et al. | 264/45.5 |
| 6,988,733 B2 | 1/2006 | Hatch | |
| 7,462,024 B2 * | 12/2008 | Dooley et al. | 425/125 |
| 7,464,942 B2 * | 12/2008 | Madigan | 277/569 |
| 2002/0158421 A1 | 10/2002 | Johnston | 277/549 |
| 2004/0160016 A1 | 8/2004 | Hatch | 277/551 |
| 2007/0057472 A1 | 3/2007 | Hatch | |

FOREIGN PATENT DOCUMENTS

| | | |
|---|---|---|
| JP | 01-193467 | 8/1989 |
| JP | 03-077861 | 8/1991 |

\* cited by examiner

RADIAL SEAL AND METHOD OF MAKING

CROSS-REFERENCE TO RELATED APPLICATION

This application is a continuation-in-part of application Ser. No. 11/224,362, for a RADIAL SEAL AND METHOD OF MAKING, filed Sep. 12, 2005, which is incorporated by reference in its entirety.

BACKGROUND OF THE INVENTION

1. Field of the Invention

This invention relates generally to radial seals. More particularly, the invention relates to a method for making an improved fluoropolymer radial seal, such as a radial shaft seal, that is bonded directly to an elastomeric casing layer.

2. Description of the Prior Art

Radial shaft seals that are designed for use in sealing the main rotating shaft of vehicle air conditioner compressors, superchargers, power steering pumps, and engine crankshafts may utilize multiple sealing elements designed such that a first sealing element facing the fluid or gas to be sealed is an elastomer, such as a natural or synthetic rubber. The elastomer generally has sufficient flexibility and resilience to provide a seal against the shaft. A second stiffer, lower friction, and more chemically resistant sealing element is generally positioned behind and in tandem with the elastomeric seal such that an axial gap is provided between the sealing edge of the stiffer wear-resistant seal and the back sealing edge of the more resilient elastomeric sealing element. The second sealing element is generally made from a fluoropolymer, such as polytetrafluoroethylene (PTFE), or a filled PTFE material which incorporates one or more known filler materials to control the mechanical, tribological or other properties of the PTFE.

Generally in the art, the elements of such seal structures have been typically assembled together and then are clamped together in a unit using a crimping process. In such a process, a rubber element and the PTFE component are crimped between two rigid casings to form a seal. The PTFE component is also typically crimped between the rubber element and one of the rigid casings. It is known in the art to utilize a flat PTFE washer or preformed conical-shaped structure that is bonded or clamped to form the overall seal.

Other radial shaft seal designs have also been proposed which do not utilize crimping or clamping of the elastomer and PTFE component into a rigid casing, but rather utilize a metal casing to which the PTFE sealing element is attached by molding an elastomeric member to both the PTFE sealing element and the metal casing. In such designs, the PTFE element may be used only as a bearing member to support and control the load of the elastomeric sealing element, such that the sealing function is entirely performed by the elastomeric sealing element. An example of such a seal configuration is shown in U.S. Pat. No. 4,274,641 to Cather. In this configuration the PTFE bearing member and the elastomeric sealing lip are bonded in tandem and are both in contact with the shaft surface. Similarly, in U.S. Pat. No. 6,428,013 to Johnston et al. several seal designs are disclosed where both the PTFE sealing element and elastomeric element are in contact with the shaft surface on which sealing is to be affected.

Still other seal designs have also been proposed which do not incorporate an elastomeric sealing element and which rely entirely on a PTFE sealing element to provide the fluid seal. One such radial shaft seal design is described in U.S. Pat. No. 4,650,196 to Bucher et al. In Bucher et al., the PTFE element is bonded over a portion of its length to an elastomeric casing which is in turn bonded to a rigid casing. Similarly, in Johnston et al. several seal designs which incorporate a PTFE sealing element as the primary sealing element are disclosed.

One limitation of the related art radial shaft designs, such as those described above, is that the PTFE sealing element does not seal along its entire length. For example, in the designs of Johnston et al. the PTFE sealing element is not in contact with the shaft along its entire length. This is also the case for the PTFE member of Bucher et al. leading to a sub-optimal use of the available PTFE sealing material. Furthermore, these radial seal designs also provide limited control of the sealing pressure applied either by the PTFE sealing element itself to the shaft or other sealing surface, or else by the combination of the elastomeric casing and the PTFE sealing element to the shaft or other sealing surface because of the limited contact area of the PTFE. In addition to the limitations noted above, related art radial shaft seal designs also have known limitations with respect to installation of the seals onto the shaft or other member to be sealed. Many of the known designs where the PTFE lip is the primary sealing lip have the free end of the radial sealing lip facing the fluid side, usually the oil side, of the sealed region. These configurations are known to be difficult to install onto circular shafts and the like, necessitating the use of special fixtures and installation tools, and special assembly precautions or methods to assemble such seals on shafts so as to avoid nicking or otherwise damaging the surface of the PTFE material, and thus destroying the functionality of the seals. Fluoropolymer sealing materials, such as PTFE, are known to be very susceptible to nicking or other surface damage to the sealing surface which can compromise their ability to seal effectively. Reverse lay down configurations of the PTFE sealing element, where the free end of the sealing element faces away from the oil side of the installation, have been proposed, such as in Johnston et al., in order to enhance the ability to install such seals and lessen the susceptibility to nicking, inverse folding, or creasing during installation. However, such seal configurations are still believed to be subject to other limitations, such as those described above.

SUMMARY OF THE INVENTION

In summary, the invention is a method of manufacturing a radial shaft seal assembly. The method includes the step of stretching an inner diameter of a ring-shaped polytetrafluoroethylene seal radially outward from an axis with a mandrel to a first stretched condition on a mold core element. The method also includes the step of defining a substantially enclosed mold cavity around the polytetrafluoroethylene seal stretched over the mold core element with at least one mold element. The method also includes the step of locating a rigid casing within the mold cavity spaced from the stretched polytetrafluoroethylene seal. The method also includes the step of introducing a liquefied rubber elastomer into the mold cavity. The method also includes the step of molding the liquefied rubber elastomer under heat and pressure such that the rigid casing and polytetrafluoroethylene seal in a stretched state are bonded to a solid rubber elastomer member. The method also includes the step of removing the collectively bonded polytetrafluoroethylene seal and rigid casing and rubber elastomer member from the mold core element without stretching the inner diameter of the polytetrafluoroethylene seal beyond the first stretched condition.

BRIEF DESCRIPTION OF THE DRAWINGS

The present invention will become more readily appreciated when considered in connection with the following detailed description and appended drawings wherein.

DETAILED DESCRIPTION OF THE EXEMPLARY EMBODIMENT

Figure 1:
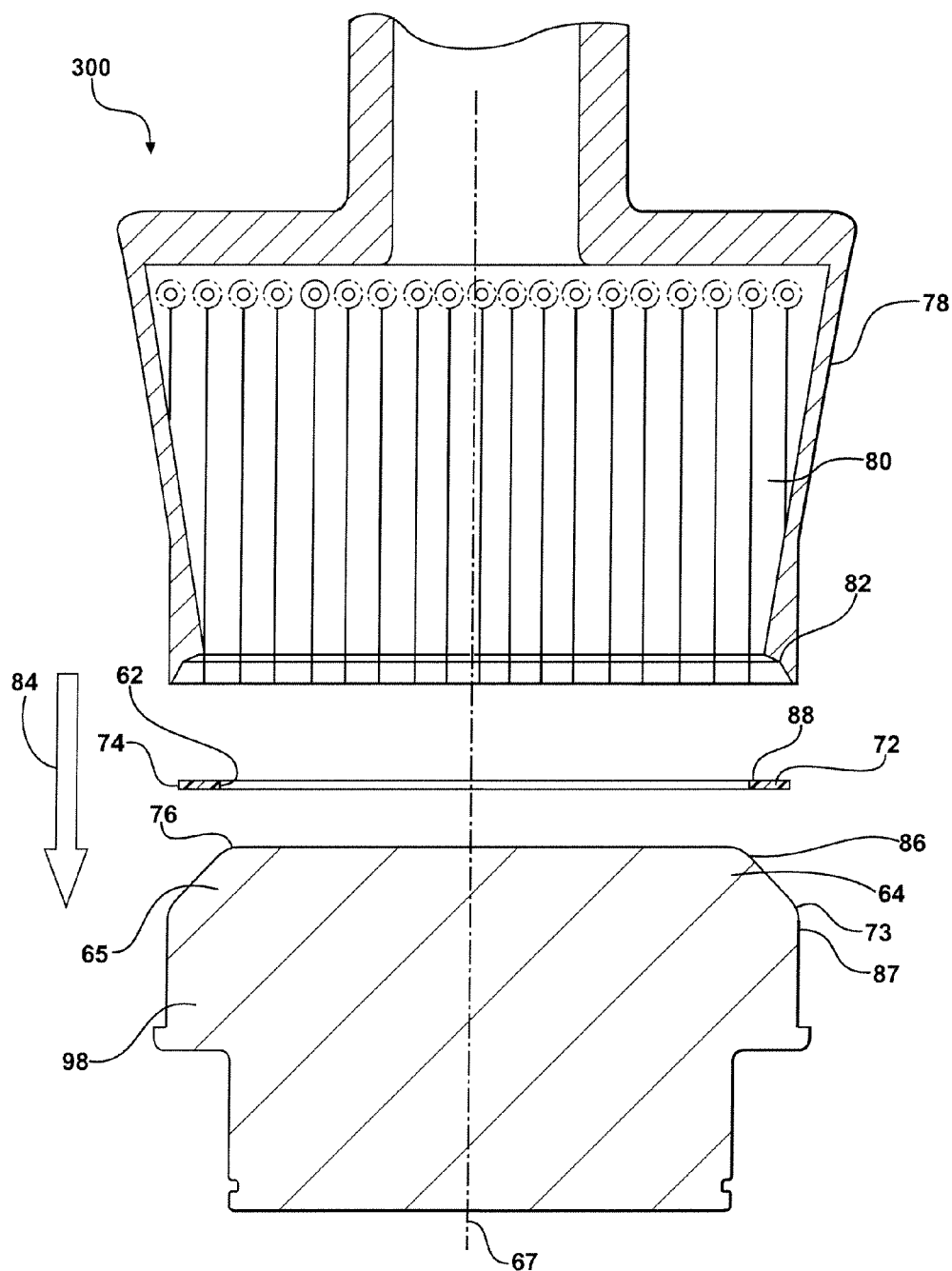
FIG. 1 is an exploded sectional view of an apparatus for stretching a seal preform according to a first exemplary embodiment of the invention.

A plurality of different embodiments of the invention are shown in the Figures of the application. Similar features are shown in the various embodiments of the invention. Similar features have been numbered with a common reference numeral and have been differentiated by an alphabetic designation. Also, to enhance consistency, features in any particular drawing share the same alphabetic designation even if the feature is shown in less than all embodiments. Similar features are structured similarly, operate similarly, and/or have the same function unless otherwise indicated by the drawings or this specification. Furthermore, particular features of one embodiment can replace corresponding features in another embodiment unless otherwise indicated by the drawings or this specification.

FIG. 1 shows a portion of an apparatus 300 for making or manufacturing a radial shaft seal. The apparatus 300 can stretch a preform 72 of a radial seal and includes a pusher 78 and a mandrel 64. The mandrel 64 extends a longitudinal axis 67 and includes a frustum portion 65 ending in maximum radial edge 73. The mandrel 64 is integrally formed with a mold core element 98 that is cylindrical.

FIG. 1 also shows a ring-shaped polytetrafluoroethylene seal in the condition of the preform 72. The preform or washer 72 has an inside diameter or surface 62 and an outside diameter or surface 74. The flat fluoropolymer washer 72 is placed onto an upper end 76 of the mandrel 64. The diameter of the upper end 76 of the mandrel 64 is smaller than the inner diameter 62 of fluoropolymer washer 72.

The expandable pusher or installation tool 78 is in the form of a plunger having an expandable lower section, such as a plurality of separate expandable fingers 80. The expandable fingers 80 each have a contact surface 82 which is used to engage the flat washer 72 as the installation tool is moved into contact with the flat washer 72 and mandrel 64 in the direction shown by arrow 84. As the fingers 80 of the expandable pusher or installation tool 78 move along a tapered outer surface 86 of the frustum portion 65 of the mandrel 64, the contact surfaces 82 of the expandable fingers 80 engage an upper surface 88 of fluoropolymer washer 72 causing it to slide down the outer surface 86 of mandrel 64. The mandrel 64 may have one or more tapers and is constructed such that the diameter of an outer surface 87 of the element 98 is greater than the inner diameter 62 of fluoropolymer washer 72. The taper of the surface 87 can be a linear profile, a convolute profile, an involute profile, or any other suitable tapered profile for pre-stressing the preform 72.

Figure 2:
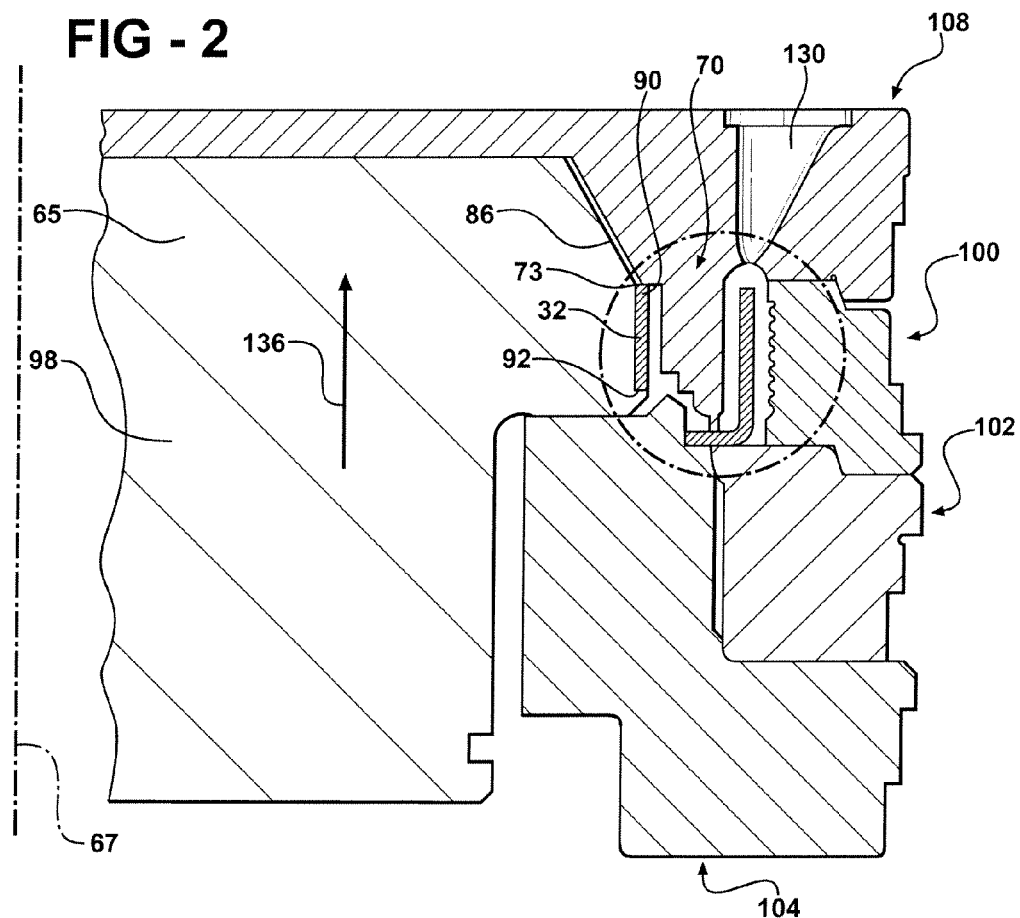
FIG. 2 is a cross-sectional view of a mold structure made up of a plurality of mold elements.

The size of the preform 72 together with the size of the mandrel 64 and element 98 determine the amount of stretching that is performed on the fluoropolymer seal preform 72 and the amount of pre-stress imparted to pre-stressed fluoropolymer seal 32 (shown in FIG. 2). The washer 72 and mandrel 64 may be selected such that the diameter of the outer surface 87 of mandrel 64 is greater than the outer diameter of fluoropolymer seal preform 72. Thus, washer 72 may be pre-stressed on both the inner diameter 62 and outer diameter 74.

Referring now to FIGS. 1 and 2, the washer 72 slides down the outer surface 86 of the mandrel 64 by lowering the plunger 78 with respect to the mandrel 64. As a result, the washer 72 is plastically stretched and becomes the seal 32. The seal 32 will be in a pre-stressed condition at a first end 90 at least. The inner diameter 62 of the pre-form 72 corresponds to the end 90 of the pre-stressed seal 32. The level of stress along the length of the pre-stressed fluoropolymer seal 32 can vary because the portion of the washer 72 adjacent to the inner diameter 62 of the fluoropolymer washer 72 is stretched to a greater extent than portion adjacent to the outer diameter 74. The outer diameter 74 may also be expanded as it glides downward along the mandrel 64, thereby pre-stressing a second end 92 of fluoropolymer seal 32.

U.S. patent application Ser. No. 11/224,362 provides additional details of an exemplary embodiment of the present invention with respect to positioning the preform or washer 72 on the element 98. The '362 application is incorporated by reference in its entirety as teachings for an exemplary embodiment of the present invention. Other methods for positioning the a seal on mandrel may be practiced in connection with the present invention.

FIG. 2 shows the seal 32 disposed on the element 98 and a mold cavity 70 defined around the pre-stressed seal 32. In the exemplary embodiment of the invention, a plurality of mold elements 100, 102, 104, 108 cooperate with the element 98 to define the mold cavity 70. In alternative embodiments of the invention, the mold cavity 70 may be defined by less than five mold elements or by more than five mold elements.

Figure 3:
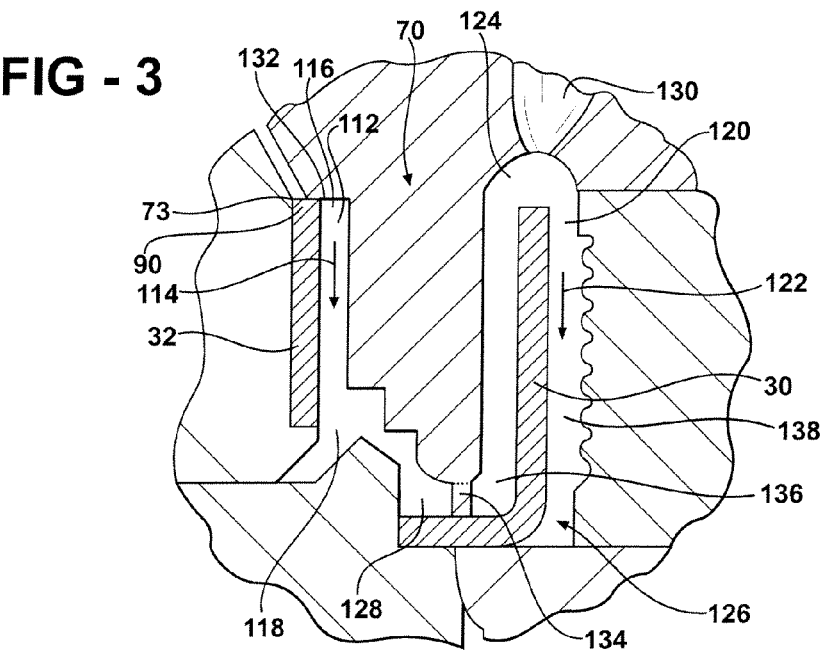
FIG. 3 is magnified portion of FIG. 2 focused on the mold cavity defined by the mold structure.

Referring now to FIG. 3, the mold cavity 70 includes a first portion 112 that extends sleeve-like a first distance in a direction represented by arrow 114, the direction being parallel to the axis 67 (shown in FIGS. 1 and 2). The first portion 112 extends from a first end 116 proximate to the edge 73 and a second end 118 spaced from the first end 116. The mold cavity 70 also includes a second portion 120 spaced radially outward of the first portion 112 with respect to the axis 67 (shown in FIGS. 1 and 2). The second portion 120 extends sleeve-like a second distance in a direction represented by arrow 122, the direction being parallel to the axis 67. The second portion 120 extends between first and second ends 124, 126 that are spaced from one another. In operation, a casing 30 can be disposed in the second portion and thus bifurcate the second portion 120 into two sub-sleeve portions 136, 138 that are radially spaced from one another with respect to the axis 67 and in communication with one another at the first end 124.

The mold cavity 70 also includes a third portion 128 that extends radially with respect to the axis 67 between both of the second ends 118, 126 to place the first and second portions 112, 120 in fluid communication with one another, the second portion 120 connected through the sub-sleeve 136 in the exemplary embodiment of the invention when a casing 30 is in the mold cavity 70. The third portion 128 extends transverse to the axis 67. The cross-section of FIG. 3 shows a chaplet 134; the chaplet 134 is not present in all cross-sections of the mold cavity.

As a result of the configurations of the first, second and third portions 112, 120 and 128, the cross-section of the mold cavity can be U-shaped, J-shaped, W-shaped, V-shaped, H-shaped, or any other shape that generally turns on itself as it extends between the first end 116 of the first portion 112 and the first end 124 of the second portion 120.

Referring now to FIGS. 2 and 3, an injection port 130 is disposed proximate the first end 124 of the second portion 120 in the exemplary embodiment of the invention. As a result, the injection port 130 is a substantially maximum distance away from the edge 73 and the end 90 that is under the maximum pre-stress. In a molding operation, the casing 30 can be disposed in the mold cavity in spaced relation to the seal 32. Liquefied rubber elastomer can be directed through the injection port 130 and fill the mold cavity 70. The liquefied rubber elastomer can flow around the chaplet 134. The liquefied rubber elastomer can be molded under heat and pressure such that the rigid casing 30 and polytetrafluoroethylene seal 32 in a stretched state are bonded to a solid rubber elastomer member.

A comparison between FIG. 2 and the figures of the '362 application reveals that the seal 32 is not disposed in an annular notch defined in the mandrel 64. A surface 132 is defined by the mold element 108 and is disposed proximate to the end 90 to support the seal 32 against movement during the molding operation. A radial gap of 0.0005-0.0025 can be defined between the end 90 and the surface 132. A larger gap may not be desirable; a larger gap may allow a sufficient quantity of PTFE material and/or liquefied rubber elastomer to penetrate between the surface 132 and the end 90 and form a burr. The burr would be present on the lead sealing edge of the radial seal assembly and would therefore require trimming.

Upon completion of a molding operation, the collectively bonded polytetrafluoroethylene seal 32 and rigid casing 30 and rubber elastomer member (a complete radial seal assembly) can be removed from the element 98 without stretching the inner diameter 62 (or end 90) of the polytetrafluoroethylene seal 32 beyond the first stretched condition. The mold element 108 and the element 98 can be moved away from one another and the radial seal assembly can be moved in the direction represented by arrow 136.

Figure 4:
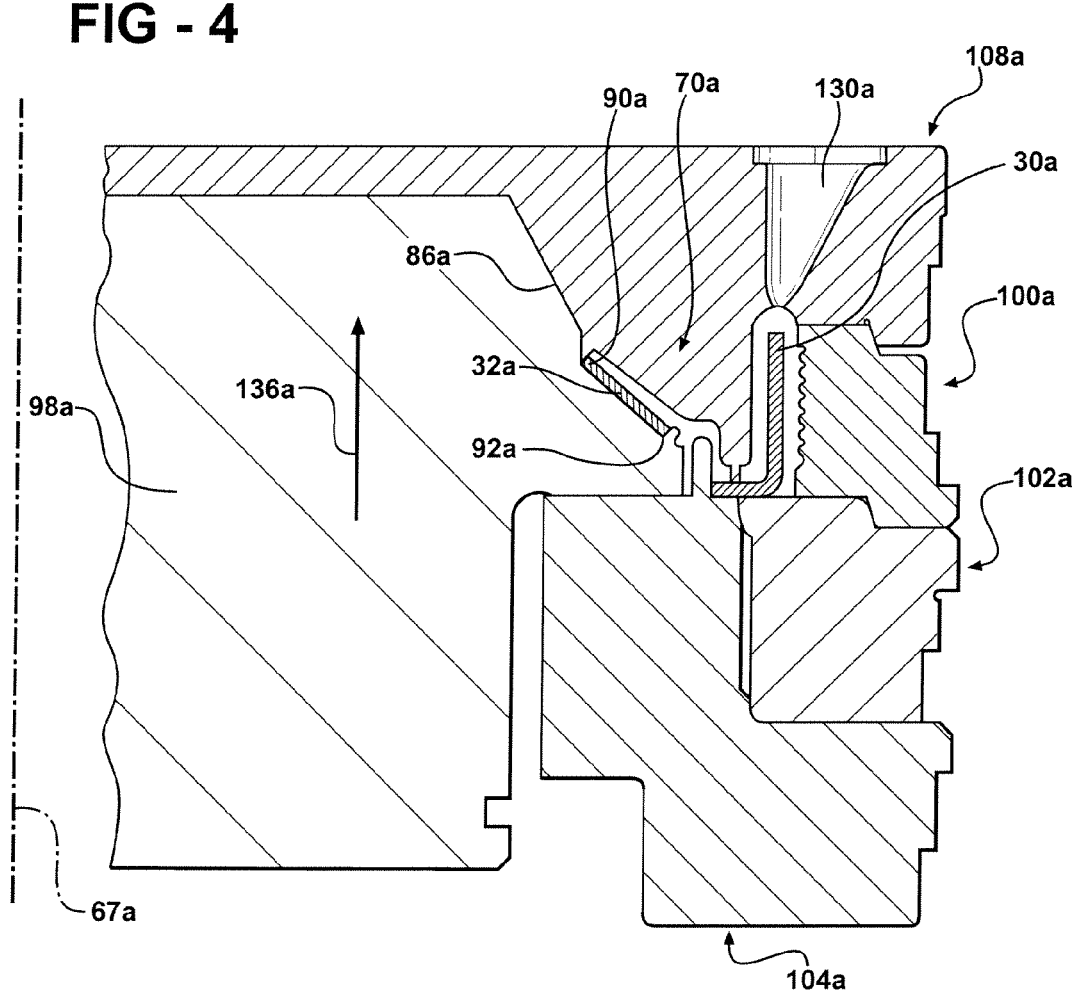
FIG. 4 is a cross-sectional view of a mold structure according to a second exemplary embodiment of the invention.

FIG. 4 shows a mold structure for practicing a second, alternative embodiment of the invention. A polytetrafluoroethylene seal 32a and a rigid casing 30a are disposed in a mold cavity 70a having an annular configuration centered on an axis 67a. The mold cavity 70a is defined by a plurality of mold elements 98a, 100a, 102a, 104a, and 108a. An injection port 130a is a substantially maximum distance away from an end 90a of the seal 32. In a molding operation, liquefied rubber elastomer can be directed through the injection port 130 and fill the mold cavity 70. The liquefied rubber elastomer can be molded under heat and pressure such that the rigid casing 30a and polytetrafluoroethylene seal 32a in a stretched state are bonded to a solid rubber elastomer member.

In the second exemplary embodiment of the invention, a first end 90a of the polytetrafluoroethylene seal 32a is stretched radially outward from the axis 67a to a first stretched diameter. A second end 92a of the polytetrafluoroethylene seal 32a is stretched radially outward from the axis 67a to a second stretched diameter. The second stretched diameter is greater than the first stretched diameter in the second exemplary embodiment of the invention; the two diameters were the same in the first exemplary embodiment of the invention. Making the stretched diameter of the second end greater than the stretched diameter of the first end does not necessarily imply that the second end is stretched more than the first end. As set forth above, the ends (90, 90a, 92, 92a) shown in the cross-sectional views correspond to the inner and outer diameters of the ring-like seal and the extent of stretching for each end is the stretching of those diameters. In the first embodiment, the outer diameter is less stretched than the inner diameter because the diameters are substantially equal when the seal 32 is in the stretched condition. In the second embodiment, the inner and outer diameters are more similarly stretched because the outer diameter (represented by the end 92a) is greater than the inner diameter. The stretched diameter of the outer end (92 or 92a) can be selected in view of the expected operating environment. For example, if it were desirable for the outer diameter of the ring-like seal 32 to be biased to contract radially inwardly at a relative greater rate, the second embodiment of the invention may be the preferred. On the other hand, if it were desirable for the outer diameter of the ring-like seal 32 to be biased to contract radially inwardly at a relatively weaker rate, the first embodiment of the invention may be the preferred.

Obviously, many modifications and variations of the present invention are possible in light of the above teachings and may be practiced otherwise than as specifically described while within the scope of the appended claims. In addition, the reference numerals in the claims are merely for convenience and are not to be read in any way as limiting.

What is claimed is:

1. A method of manufacturing a radial shaft seal assembly comprising the steps of: providing a mold core element having an outer surface terminating at a flange; stretching an inner diameter of a ring-shaped polytetrafluoroethylene seal radially outward from an axis over the mold core element with a pusher to a first stretched condition overlying the outer surface and registered against the flange of the mold core element; removing the pusher from the seal and exposing one distal end of the seal; after step of removing the pusher, defining a substantially enclosed mold cavity around the polytetrafluoroethylene seal stretched over the mold core element with at least one mold element movable relative to the mold core element; said defining step including moving a surface of the mold element into close proximity with the exposed one end of the seal; locating a rigid casing within the mold cavity spaced from the stretched polytetrafluoroethylene seal; introducing a liquefied rubber elastomer into the mold cavity while preventing the flow of elastomer between the one end of the seal and the surface of the mold element; molding the liquefied rubber elastomer under heat and pressure such that the rigid casing and the stretched polytetrafluoroethylene seal are bonded together by a solid rubber elastomer member; and removing the collectively bonded polytetrafluoroethylene seal and rigid casing and rubber elastomer member from the mold core element without stretching the inner diameter of the polytetrafluoroethylene seal beyond the first stretched condition.

2. The method of claim 1 wherein said introducing step includes the step of:
   injecting the liquefied rubber elastomer into the mold cavity a substantially maximum distance away from the inner diameter of the polytetrafluoroethylene seal.

3. The method of claim 1 wherein said stretching step is further defined as:
   stretching the inner diameter of the ring-shaped polytetrafluoroethylene seal radially outward from the axis to a first stretched diameter; and
   stretching an outer diameter of the ring-shaped polytetrafluoroethylene seal radially outward from the axis to a second stretched diameter greater than the first stretched diameter.

* * * * *